(12) United States Patent
Ulrich et al.

(10) Patent No.: US 11,745,541 B2
(45) Date of Patent: Sep. 5, 2023

(54) LINER PLATE FOR WORK MACHINE

(71) Applicant: Caterpillar Inc., Peoria, IL (US)

(72) Inventors: Brian Ulrich, Palatine, IL (US); Amit Kashyap, Elgin, IL (US); David Lee Childers, Elgin, IL (US); Mitchell Antonio Hershey Munar, Robbinsdale, MN (US); Travis Charles Parker, Bloomington, MN (US)

(73) Assignee: Caterpillar Inc., Peoria, IL (US)

( * ) Notice: Subject to any disclaimer, the term of this patent is extended or adjusted under 35 U.S.C. 154(b) by 87 days.

(21) Appl. No.: 17/405,106

(22) Filed: Aug. 18, 2021

(65) Prior Publication Data
US 2023/0054301 A1   Feb. 23, 2023

(51) Int. Cl.
*B60B 35/16*   (2006.01)

(52) U.S. Cl.
CPC ...... *B60B 35/166* (2013.01); *B60B 2310/302* (2013.01); *B60B 2900/212* (2013.01); *B60Y 2200/413* (2013.01)

(58) Field of Classification Search
CPC ..... B60B 35/166; B60B 35/163; B62D 25/18; B62D 25/168; B62D 25/16; B62D 25/163; B62D 25/186
See application file for complete search history.

(56) References Cited

U.S. PATENT DOCUMENTS

| | | | |
|---|---|---|---|
| 1,957,361 A * | 5/1934 | Schofield | B62D 25/18 280/152.05 |
| 3,497,237 A * | 2/1970 | Vis | B62D 25/168 280/847 |
| 3,879,059 A * | 4/1975 | Gibes | B62D 25/168 280/848 |
| 3,913,985 A | 10/1975 | Orr et al. | |
| 5,733,020 A | 3/1998 | McCartney et al. | |
| 5,951,123 A | 9/1999 | Bomstad et al. | |
| 6,076,843 A * | 6/2000 | Sewell | B62D 25/18 280/157 |
| 6,322,170 B1 | 11/2001 | Knell et al. | |

(Continued)

FOREIGN PATENT DOCUMENTS

GB   2191457 A * 12/1987 ........... B62D 25/168

OTHER PUBLICATIONS

O'Brien, Robert L . . . (1997). Jefferson's Welding Encyclopedia (18th Edition)—Appendix 5: Types of Weld Joints. American Welding Society (AWS). Retrieved from www.knovel.com. (Year: 2022).*

*Primary Examiner* — Daniel D Yabut (57) ABSTRACT

A liner plate for a work machine has a frame with a frame surface and an axle opening, and a guard member at least partially disposed above the axle opening. The guard member has a lower face, a region of the frame surface and a region of the lower face define a volume. The liner plate includes a body portion defining an upper surface and a lower surface opposite to the upper surface. The body portion defines a first side surface and a second side surface. The body portion is adapted to be coupled to the frame surface proximate the first side surface. The body portion is adapted to be coupled to the guard member proximate the second side surface. Further, upon coupling of the body portion to the frame surface and the guard member, the body portion prevents at least some debris from entering the volume.

20 Claims, 7 Drawing Sheets

(56) References Cited

U.S. PATENT DOCUMENTS 7,556,323 B1 * 7/2009 Gachhadar ............ B60B 15/025
  305/100
9,630,657 B2 * 4/2017 Ries ........................ E01C 19/23

* cited by examiner

LINER PLATE FOR WORK MACHINE

TECHNICAL FIELD

The present disclosure relates to a liner plate for a work machine, and a method of deflecting debris away from the work machine.

BACKGROUND

Work machines, such as compactors, are used for performing various compaction operations. Further, a landfill compactor is a type of compactor that may be used to compact materials, such as garbage or other debris, deposited at landfills. During compaction operations, it may be possible that debris may contact various components of the landfill compactor, such as an axle assembly of the landfill compactor.

The landfill compactor generally includes a guard member that is welded to a frame of the landfill compactor to protect the axle assembly from debris. During compaction operations, an axle of the landfill compactor may oscillate which may cause debris to be directed towards the guard member. Such debris may accumulate between the guard member and the frame. In some instances, the debris may contact a weld joint between the guard member and the frame. Further, continued oscillations and the accumulation of debris proximate the weld joint may cause failure of the weld joint in a fatigue or overload condition.

If the weld joint fails, the guard member may have to be replaced, thereby increasing machine downtime and servicing cost. Moreover, in some situations, an axle guard or an engine end frame of the work machine may also get damaged due to continued exposure to debris, which may in turn warrant extensive repairs and replacements.

U.S. Pat. No. 6,322,170 describes an apparatus and a method of preventing refuse from wrapping around an axle of a work machine. The work machine includes a frame surface, the axle, at least one wheel, an operator compartment, an engine, and an axle protection system. The at least one wheel has a rim extension having an outer portion. The axle protection system includes a roof guard and an axle guard assembly. The axle guard assembly has a plate and a labyrinth guard. A channel is provided by the configuration of the guard assembly, plate, and labyrinth guard such that the outer portion of the rim extension is received by the channel. The plate extends substantially vertically from the perimeter of the axle guard assembly. Preferably, a flexible member is attached to the edge of the plate and extends such that it is urged in contact with the roof guard.

SUMMARY OF THE DISCLOSURE

In one aspect of the present disclosure, a liner plate for a work machine is provided. The work machine has a frame with a frame surface and an axle opening, and a guard member at least partially disposed above the axle opening and at least partially projecting from the frame surface both outward and toward the axle opening. The guard member has a lower face, a region of the frame surface and a region of the lower face define a volume. The liner plate includes a body portion. The body portion defines an upper surface. The body portion also defines a lower surface opposite to the upper surface. The body portion further defines a first side surface extending between the upper and lower surfaces. The body portion is adapted to be coupled to the frame surface proximate the first side surface. The body portion defines a second side surface extending between the upper and lower surfaces. The body portion is adapted to be coupled to the guard member proximate the second side surface. Further, upon coupling of the body portion to the frame surface and the guard member, the body portion prevents at least some debris from entering the volume.

In another aspect of the present disclosure, a work machine is provided. The work machine includes a frame with a frame surface and an axle opening. The work machine also includes a guard assembly coupled to the frame surface. The guard assembly includes a guard member defining a first end. The guard member is coupled to the frame surface proximate the first end. The guard member is at least partially disposed above the axle opening and at least partially projects from the frame surface both outward and toward the axle opening. The guard member has a lower face, a region of the frame surface and a region of the lower face defining a volume. The guard assembly also includes a liner plate coupled to the frame surface and the guard member. The liner plate includes a body portion. The body portion defines an upper surface. The body portion also defines a lower surface disposed opposite to the upper surface. The body portion further defines a first side surface extending between the upper and lower surfaces. The body portion is coupled to the frame surface proximate the first side surface. The body portion defines a second side surface extending between the upper and lower surfaces. The body portion is coupled to the guard member proximate the second side surface. Further, upon coupling of the body portion to the frame surface and the guard member, the body portion prevents at least some debris from entering the volume.

In yet another aspect of the present disclosure, a method of deflecting debris away from a work machine is provided. The work machine has a frame with a frame surface and an axle opening, and a guard member at least partially disposed above the axle opening and at least partially projecting from the frame surface both outward and toward the axle opening. The guard member has a lower face, a region of the frame surface and a region of the lower face defining a volume. The method includes coupling the guard member to the frame surface. The guard member defines a first end, such that the guard member is coupled to the frame surface proximate the first end. The method also includes coupling a liner plate to the frame surface. The liner plate defining an upper surface, a lower surface, a first side surface, and a second side surface. The liner plate is coupled to the frame surface proximate the first side surface of the liner plate. The method further includes coupling the liner plate to the guard member proximate the second side surface of the liner plate. Further, upon coupling of the liner plate to the frame surface and the guard member, the lower surface of the liner plate substantially limits access to the volume and prevents at least some debris from entering the volume.

Other features and aspects of this disclosure will be apparent from the following description and the accompanying drawings.

DETAILED DESCRIPTION

Wherever possible, the same reference numbers will be used throughout the drawings to refer to the same or like parts. Wherever possible, corresponding or similar reference numbers will be used throughout the drawings to refer to the same or corresponding parts.

Figure 1:
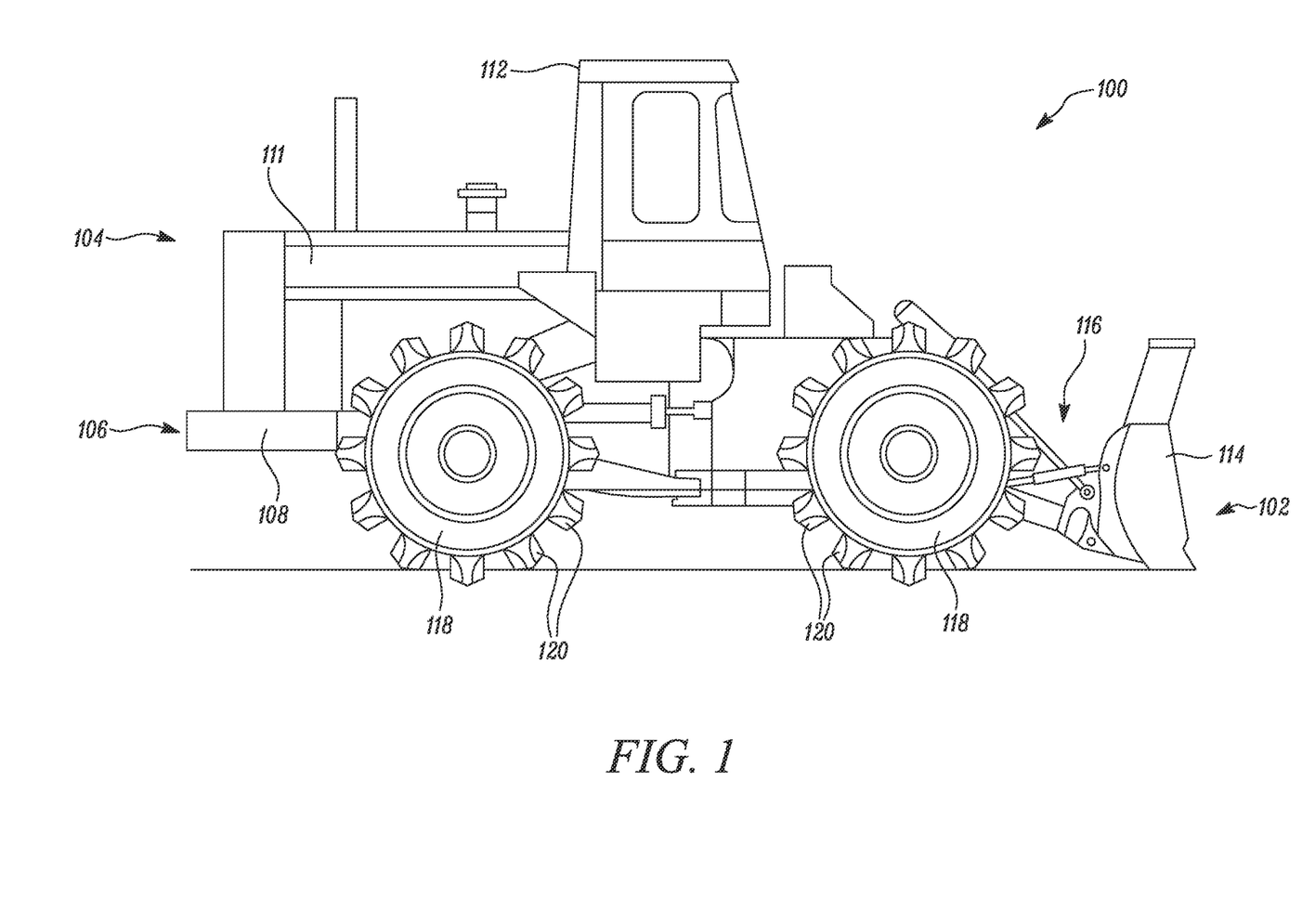
FIG. 1 illustrates a side view of a work machine, according to examples of the present disclosure.

FIG. 1 illustrates an exemplary work machine 100. The work machine 100 is embodied as a landfill compactor herein. Although shown as the landfill compactor, it may be understood that the work machine 100 may alternatively include motor graders, excavators, mining shovels, dozers, loaders, tractors, or another type of compactor, without any limitations. The work machine 100 defines a front end 102 and a rear end 104. The work machine 100 includes a frame 106 with a frame surface 108 and an axle opening 110 (shown in FIG. 2). The frame 106 supports various components of the work machine 100, such as a pair of axle assemblies (not shown), an operator cabin 112, a power source (not shown), and the like. The power source may generate an output power for performing one or more work operations. The power source may embody an engine, batteries, fuel cells, and the like, without any limitations. The engine may be an internal combustion engine. The power source may be disposed within a compartment 111 defined by the frame 106. The work machine 100 may also include a work implement 114 disposed proximate the front end 102. The work implement 114 may be operably connected to the frame 106 by a linkage assembly 116. The work implement 114 may be used for material handling, material removal, and/or material transportation.

The work machine 100 also includes a number of wheels 118 for movement and compaction purposes. In some examples, the wheels 118 may include a number of teeth 120 that extend radially from the wheels 118. The teeth 120 may contact debris and may cause the debris to break down into smaller particles during an operation of the work machine 100. In the illustrated embodiment, the work machine 100 includes two wheels 118 disposed proximate the front end 102 of the work machine 100 and two wheels 118 disposed proximate the rear end 104 of the work machine 100. Alternatively, the work machine 100 may include tracks or drums instead of the wheels 118. Further, the wheels 118 are supported by the pair of axle assemblies disposed at the front and rear ends 102, 104, respectively, of the work machine 100. Each axle assembly may include an axle and an axle guard assembly. The axle guard assembly may protect the axle from debris that may be directed towards the axle. The axle guard assembly may include an axle guard.

Figure 2:
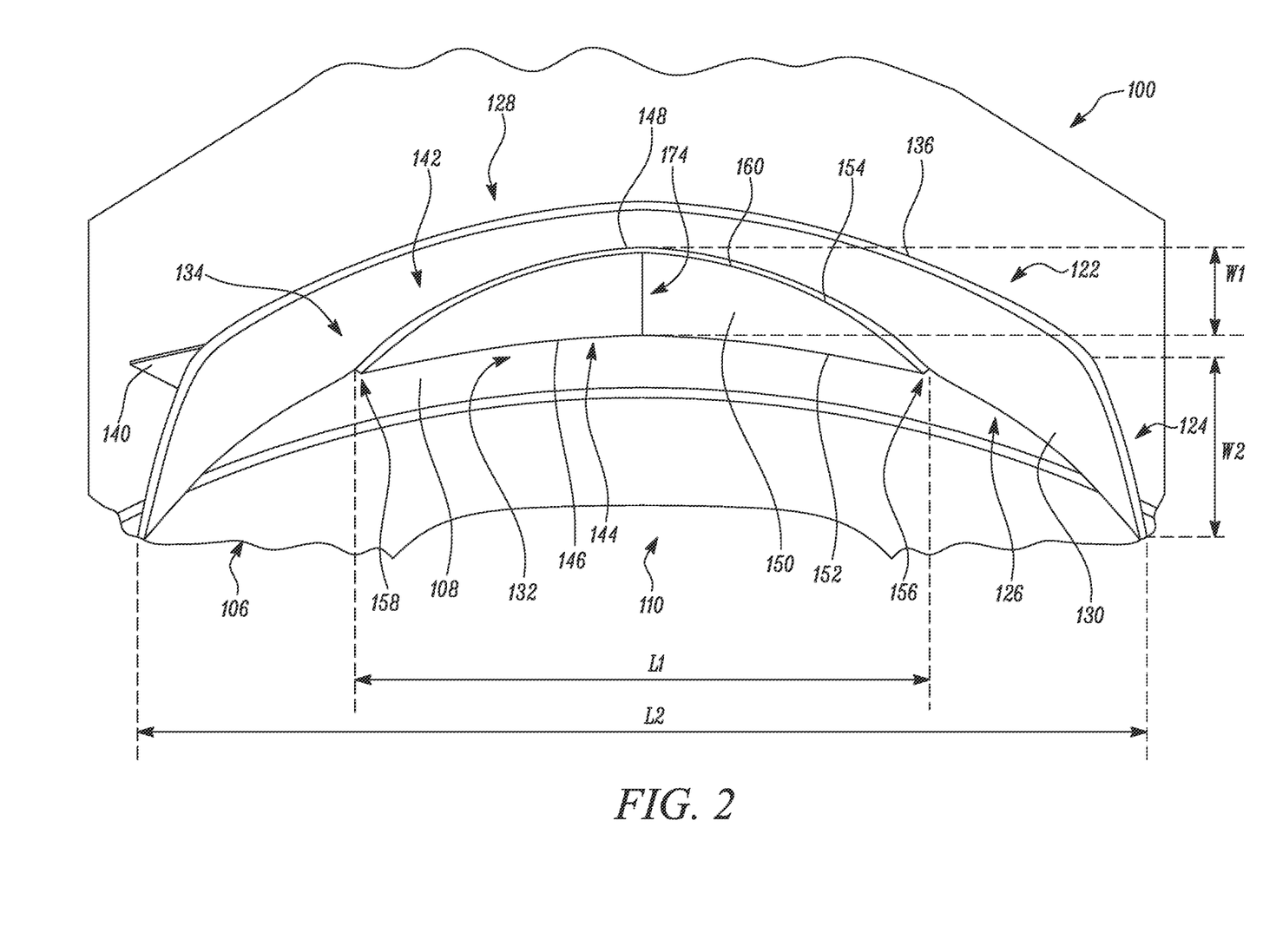
FIG. 2 illustrates a perspective view of a guard assembly associated with the work machine of FIG. 1, according to examples of the present disclosure.

Further, the work machine 100 may include four axle openings 110 (one of which is illustrated in FIG. 2). FIG. 2 illustrates the frame surface 108 and the axle opening 110 that is disposed proximate the rear end 104 (see FIG. 1) of the work machine 100. The axle opening 110 is arcuate in shape for accommodating a portion of a corresponding axle assembly. In various examples, the axle opening 110 may have a substantially semi-circular shape.

Further, the work machine 100 includes a guard assembly 122 coupled to the frame surface 108. The guard assembly 122 includes a guard member 124 defining a first end 126. The guard member 124 also defines a second end 128 opposite to the first end 126. The guard member 124 is partially disposed above the axle opening 110 and partially projects from the frame surface 108 both outward and toward the axle opening 110. The guard member 124 is disposed above the axle opening 110 to deflect debris away from the axle assembly.

The guard member 124 has a lower face 130. A region 132 of the frame surface 108 and a region 134 of the lower face 130 define a volume "V1" (shown in FIG. 5). Further, the guard member 124 also defines an upper face 136 opposite to the lower face 130. A material of the guard member 124 may include a metal, such as steel. In an example, the guard member 124 may be made of an alloy, such as alloy steel. It should be noted that the guard member 124 may be made from any other material, without any limitations. The guard member 124 defines a second maximum length "L2". Further, the guard member 124 defines a second maximum width "W2".

Further, as illustrated in FIG. 2, the guard member 124 is coupled to the frame surface 108 proximate the first end 126. The guard member 124 is coupled to the frame surface 108 such that the guard member 124 is inclined downward relative to the frame surface 108 toward the axle opening 110. More specifically, in the example illustrated at FIG. 5, the guard member 124 continuously slopes downward and toward the axle opening 110 from the first end 126 to the second end 128. Such an inclined coupling of the guard member 124 to the frame surface 108 may allow sliding of the debris from the upper face 136 of the guard member 124 downward towards a ground surface. In an example, the guard member 124 is coupled to the frame surface 108 by welding. Specifically, the guard member 124 may be coupled to the frame surface 108 by a weld joint 138 (shown in FIG. 5) that is proximate the volume "V1" defined between the frame surface 108 and the lower face 130. The weld joint 138 can extend along an entire region between the guard member 124 and the frame surface 108 (e.g., a continuous weld), or can be provided at only one or more portions of that region (e.g., spot welds). In other examples, the guard member 124 may be coupled with the frame surface 108 using any other joining techniques, without limiting the scope of the present disclosure.

In some examples, the guard assembly 122 may include one or more gussets 140, shown in FIG. 2. Each gusset 140 may embody a bracket such that one portion of the gusset 140 is coupled to the frame surface 108 and another portion of the gusset 140 is coupled to the guard member 124, for example, at the upper face 136. In an example, the guard assembly 122 may include two gussets 140, only one of which is shown in FIG. 2. The gussets 140 may be coupled to the frame surface 108 and the guard member 124 by welding or using mechanical fasteners such as bolts, screws, rivets, and the like.

Figure 3:
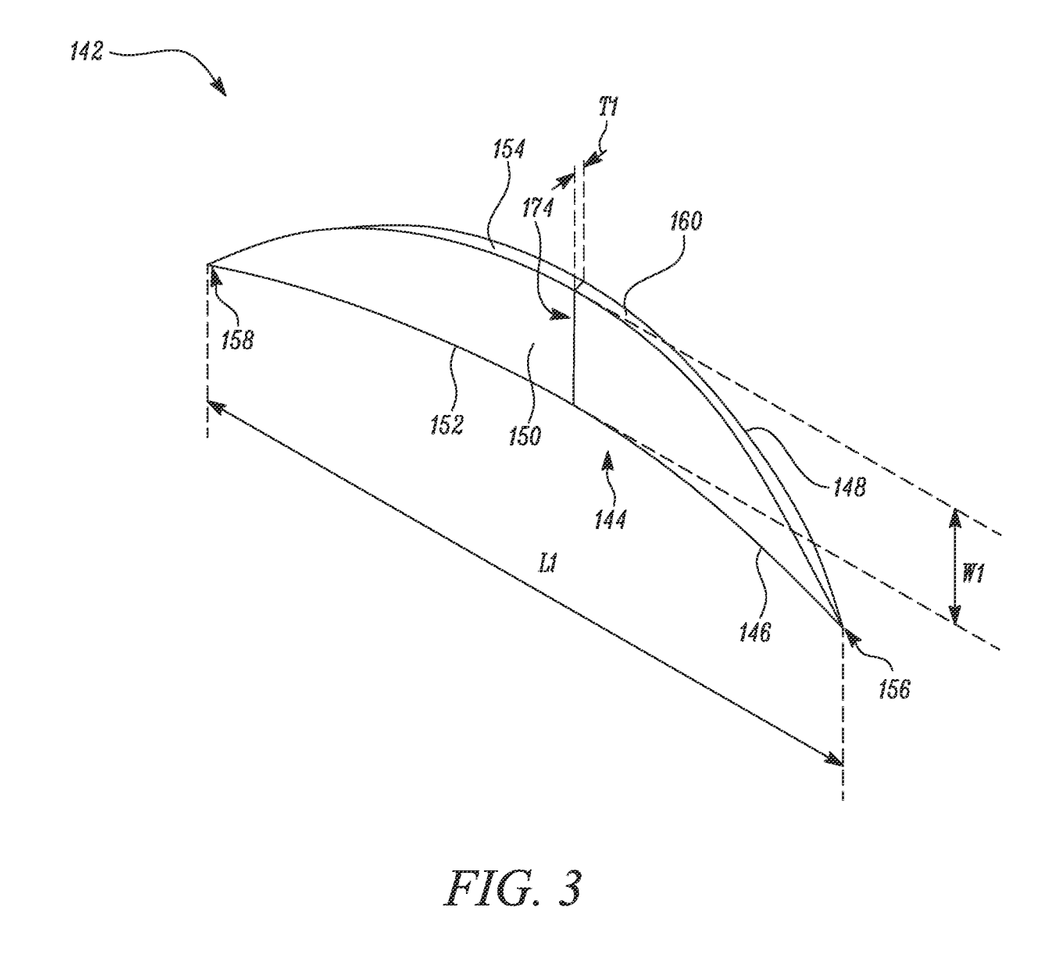
FIG. 3 illustrates a perspective view of a liner plate associated with the guard assembly of FIG. 2, according to examples of the present disclosure.

The guard assembly 122 also includes a liner plate 142 coupled to the frame surface 108 and the guard member 124. As shown in FIG. 3, the liner plate 142 includes a body portion 144. The body portion 144 may be made of a metal. The metal may include steel, such as mild steel or stainless steel. In other examples, the body portion 144 may be made of an alloy. The body portion 144 may be made of any other material, without any limitations. Alternatively, the body portion 144 may be made of a material that is similar to a material of the guard member 124 (see FIG. 2) or the frame 106.

The body portion 144 defines a first maximum length "L1" and a first maximum width "W1". The first maximum length "L1" of the liner plate 142 may be greater than the first maximum width "W1" of the liner plate 142 by a factor of at least 3. In an example, the second maximum length "L2" (see FIG. 2) of the guard member 124 may be greater than the first maximum length "L1" of the liner plate 142. Further, the second maximum width "W2" (see FIG. 5) of the guard member 124 may be greater than the first maximum width "W1" of the liner plate 142. Moreover, the body portion 144 defines a thickness "T1". The thickness "T1" of the body portion 144 may be constant across a perimeter 146 of the body portion 144.

Further, the body portion 144 defines an upper surface 148. The body portion 144 also defines a lower surface 150 opposite to the upper surface 148. The lower surface 150 faces the axle opening 110 (see FIG. 2). During the operation of the work machine 100, debris may contact the lower surface 150. Further, the thickness "T1" of the body portion 144 is defined between the upper and lower surfaces 148, 150.

Moreover, the body portion 144 defines a first side surface 152 extending between the upper and lower surfaces 148, 150. The body portion 144 also defines a second side surface 154 extending between the upper and lower surfaces 148, 150. The second side surface 154 is curved such that the first side surface 152 contacts with the second side surface 154 at a first end portion 156 and a second end portion 158 of the body portion 144. Further, the second side surface 154 defines a chamfer 160. The chamfer 160 is provided to accommodate a bevel joint 168 (shown in FIG. 5) between the second side surface 154 and the lower face 130 (see FIGS. 2 and 5) of the guard member 124.

Figure 4:
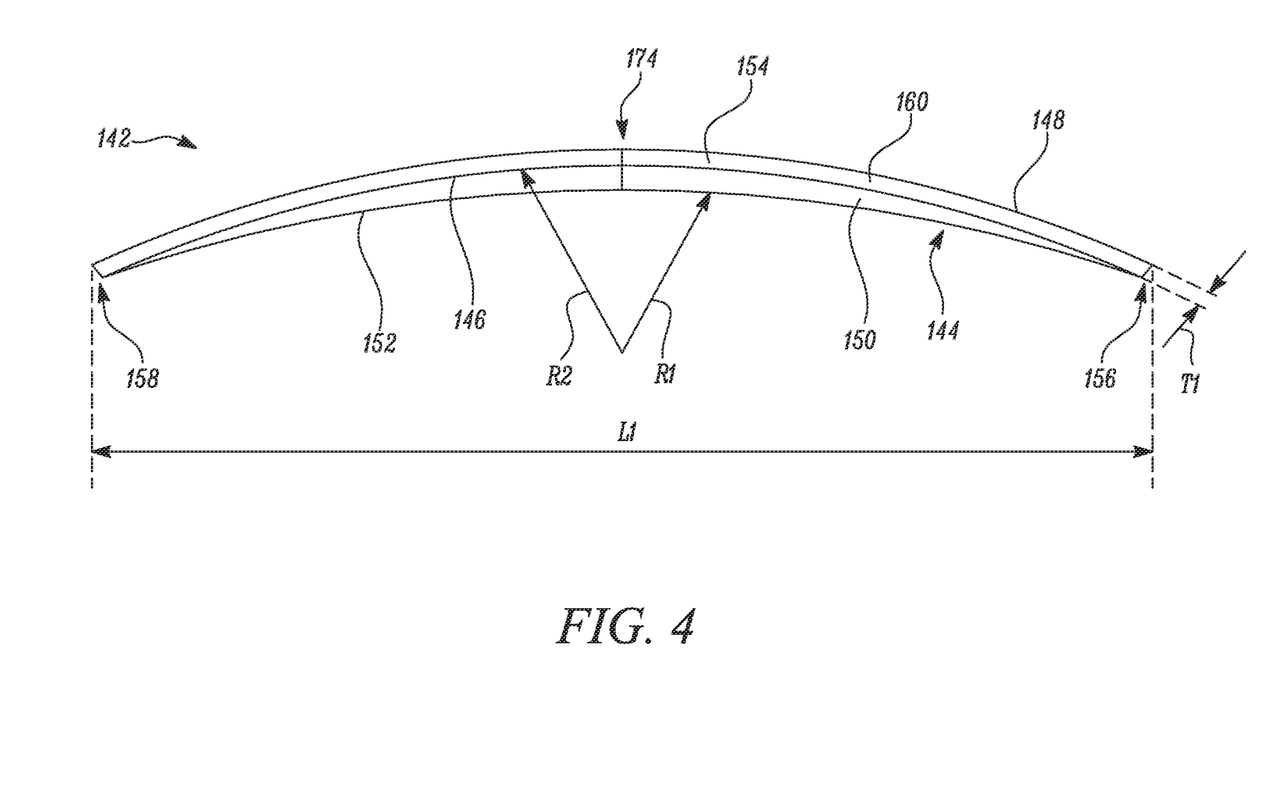
FIG. 4 illustrates a front view of the liner plate of FIG. 3, according to examples of the present disclosure.

As shown in FIG. 4, the upper and lower surfaces 148, 150 have a curved profile. Specifically, the first side surface 152 defines a first radius of curvature "R1" and the second side surface 154 defines a second radius of curvature "R2". The first radius of curvature "R1" may be substantially equal to the second radius of curvature "R2". However, in other examples, the first radius of curvature "R1" may be different from the second radius of curvature "R2".

Figure 5:
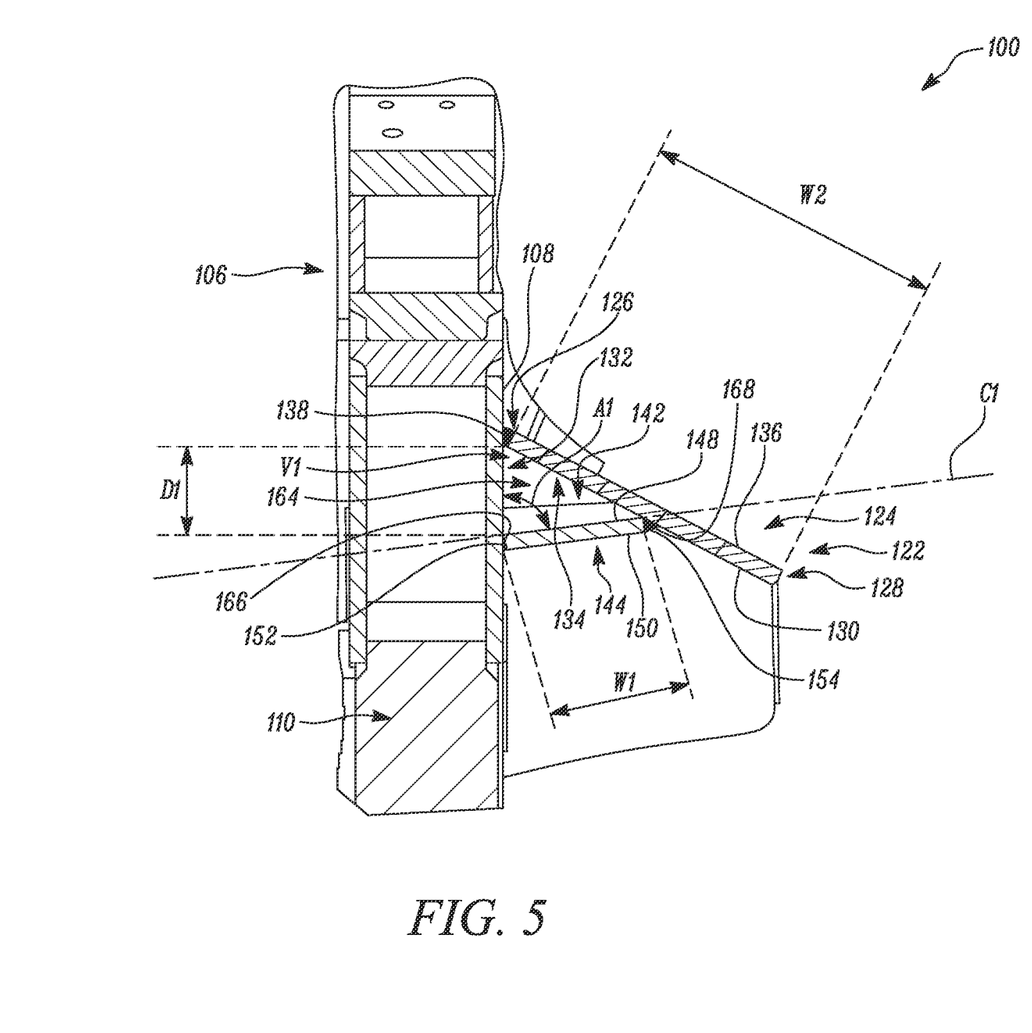
FIG. 5 illustrates a cross-sectional view of the guard assembly associated with the work machine of FIG. 1, according to examples of the present disclosure.

Referring to FIG. 5, the body portion 144 is coupled to the frame surface 108 proximate the first side surface 152. The body portion 144 may be coupled to the frame surface 108 such that the body portion 144 is inclined upward relative to the frame surface 108. More specifically, in the embodiment illustrated at FIG. 5, the body portion 144 continuously slopes upward and away from the axle opening 110 from the first side surface 152 to the second side surface 154. A first angle "A1" is defined between the frame surface 108 and a region of the body portion 144, and the first angle "A1" lies approximately between 10 degrees and 90 degrees. In one example, the first angle "A1" may be defined between the frame surface 108 and a line "C1" passing through a central region 174 (see FIGS. 2, 3, and 4) of the body portion 144 and parallel to the first maximum width "W1". It should be noted that the first angle "A1" may vary if the first angle "A1" is defined between the frame surface 108 and other regions of the body portion 144. The first angle "A1" also may be different at different regions of the body portion 144.

Further, the body portion 144 is coupled to the guard member 124 proximate the second side surface 154. Upon coupling of the body portion 144 to the frame surface 108 and the guard member 124, the first side surface 152 of the body portion 144 is located between the first end 126 of the guard member 124 and the axle opening 110 (see FIG. 2). A distance "D1" that is defined between the first side surface 152 of the body portion 144 and the first end 126 of the guard member 124 may be maximum at the central region 174 of the body portion 144. The distance "D1" between the first side surface 152 and the first end 126 of the guard member 124 may be lesser proximate the first and second end portions 156, 158 (see FIGS. 2, 3, and 4) of the body portion 144. In some examples, the first and second end portions 156, 158 may be in contact with the guard member 124.

Further, a tapered coupling of the liner plate 142 to the frame surface 108 and the guard member 124 may partially cover the volume "V1" defined between the guard member 124 and the frame surface 108. Although the liner plate 142 extends across only a portion of the guard member 124, it may be contemplated that the liner plate 142 extends substantially along the entire second maximum length "L2" of the guard member 124, as per application requirements.

Upon coupling of the body portion 144 to the frame surface 108 and the guard member 124, the body portion 144 prevents at least some debris from entering the volume "V1". Specifically, during the operation of the work machine 100, the debris may contact the lower surface 150 of the body portion 144 and may be deflected away from the volume "V1". Further, upon coupling of the body portion 144 to the frame surface 108 and the guard member 124, the body portion 144, the frame surface 108, and the guard member 124 together may define a cavity 164, such that the lower surface 150 of the body portion 144 prevents all debris from entering the cavity 164. More specifically, the cavity 164 may have a general crescent shape with a triangular-shaped cross-section (FIG. 5). The cavity 164 is a closed and isolated space formed between the frame surface 108, the guard member 124, and the body portion 144. Alternatively, the body portion 144 may be shaped and sized such that the cavity 164 may not be closed and isolated. Further, the cavity 164 may enclose the weld joint 138 and the volume "V1". In some examples, the cavity 164 may enclose only some portion of the weld joint 138 based on the first maximum length "L1" (see FIGS. 2, 3, and 4) of the body portion 144 that is highly susceptible to debris contact. However, in other embodiments, the cavity 164 may enclose the entire weld joint 138, without any limitations.

Further, the first and second side surfaces 152, 154 of the body portion 144 are coupled to the frame surface 108 and the guard member 124, respectively, by welding. It should be noted that each of the first and second side surfaces 152, 154 of the body portion 144 is welded to the frame surface 108 and the guard member 124, respectively. Specifically, the first and second side surfaces 152, 154 of the body portion 144 are coupled to the frame surface 108 and the guard member 124, respectively, by bevel joints 166, 168. Specifically, the first side surface 152 of the body portion 144 is coupled to the frame surface 108 by the bevel joint 166. More particularly, the bevel joint 166 may be formed within a first groove that is defined between the first side surface 152 and the frame surface 108. The second side surface 154 of the body portion 144 is coupled to the guard member 124 by the bevel joint 168. Specifically, the bevel joint 168 may be formed within a second groove that is defined between the second side surface 154 that defines the chamfer 160 (see FIGS. 2, 3, and 4) and the lower face 130 of the guard member 124. It should be noted that the first and second side surfaces 152, 154 of the body portion 144 may be coupled to the frame surface 108 and the guard member 124, respectively, using any other technique, without any limitations.

Figure 6:
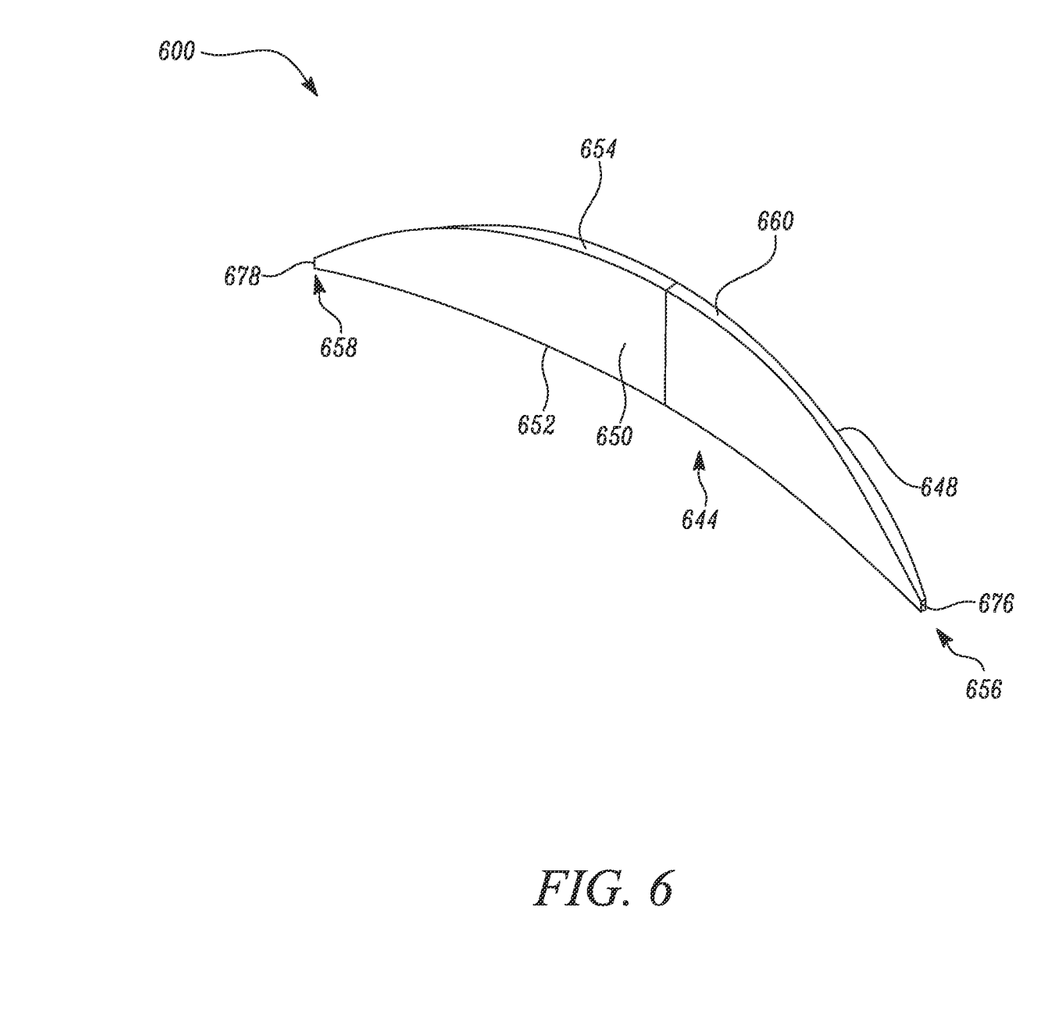
FIG. 6 illustrates a perspective view of another design of a liner plate associated with the guard assembly of FIG. 2, according to examples of the present disclosure.

FIG. 6 illustrates another design of a liner plate 600 that may be connected to the frame surface 108 (see FIG. 2) and the guard member 124 (see FIG. 2). The liner plate 600 includes a body portion 644 that may be substantially similar to the body portion 144 (see FIG. 3) associated with the liner plate 142 (see FIG. 3). Further, the body portion 644 defines an upper surface 648 and a lower surface 650 that may be substantially similar to the upper surface 148 (see FIG. 3) and the lower surface 150 (see FIG. 3) of the liner plate 142. Moreover, the body portion 644 defines a first side surface 652 and a second side surface 654 extending between the upper and lower surfaces 648, 650. Further, the first side surface 652 and the second side surface 654 may be substantially similar to the first side surface 152 (see FIG. 3) and the second side surface 154 (see FIG. 3) of the liner plate 142.

Further, the body portion 644 includes a third side surface 676 disposed proximate to a first end portion 656 of the body portion 644. Specifically, the third side surface 676 connects the first and second side surfaces 652, 654 proximate to the first end portion 656. Moreover, the body portion 644 includes a fourth side surface 678 disposed proximate to a second end portion 658 of the body portion 644. Specifically, the fourth side surface 678 connects the first and second side surfaces 652, 654 proximate to the second end portion 658. The third and fourth side surfaces 676, 678 extend between the upper and lower surfaces 648, 650. The third and fourth side surfaces 676, 678 may provide a clearance for accommodation of a bevel joint (similar to the bevel joint 168 explained in relation to FIG. 5) proximate to the lower face 130 (see FIGS. 2 and 5) of the guard member 124. Further, the second side surface 654 defines a chamfer 660. It should be noted that the chamfer 660, the third side surface 676, and the fourth side surface 678 may together allow accommodation of the bevel joint between the second side surface 654 and the lower face 130 of the guard member 124.

INDUSTRIAL APPLICABILITY

The present disclosure relates to the liner plate 142, 600 for the work machine 100 and a method 700 of deflecting debris away from the work machine 100. This section will be explained in relation to the liner plate 142 illustrated in FIGS. 2 to 5. However, it should be noted that the details provided herein are equally applicable to the liner plate 600 illustrated in FIG. 6, without any limitations. During the operation of the work machine 100, the axle of the work machine 100 may oscillate which may allow debris to contact and accumulate on one or more components of the work machine 100. The liner plate 142 described herein may prevent trapping of debris between the guard member 124 and the frame 106. More particularly, the liner plate 142 may be installed in such a way that the liner plate 142 encloses the volume "V1" defined between the guard member 124 and the frame surface 108. As the debris do not enter the volume "V1", a portion of the weld joint 138 between the frame surface 108 and the guard member 124 may be less susceptible to failure, thereby increasing an operating life of the weld joint 138 and the guard member 124. The liner plate 142 may be disposed in such a way that the liner plate 142 may also prevent debris from entering the cavity 164 formed between the body portion 144, the frame surface 108, and the guard member 124.

Further, the liner plate 142 may reduce machine downtime and cost associated with replacement/servicing of the guard member 124. Moreover, the liner plate 142 may safeguard other components of the work machine 100, such as the axle guard and an engine end frame, by deflecting debris away from such components.

Further, during the operation of the work machine 100, some debris may fall on the upper face 136 of the guard member 124. The coupling of the liner plate 142 below the guard member 124 may allow a uniform distribution of loads on the upper face 136 of the guard member 124, which may in turn increase the operating life of the guard member 124. The liner plate 142 described herein is cost effective and includes a simple design. Moreover, the liner plate 142 may be retrofitted on existing work machines during a maintenance schedule of the work machines.

Figure 7:
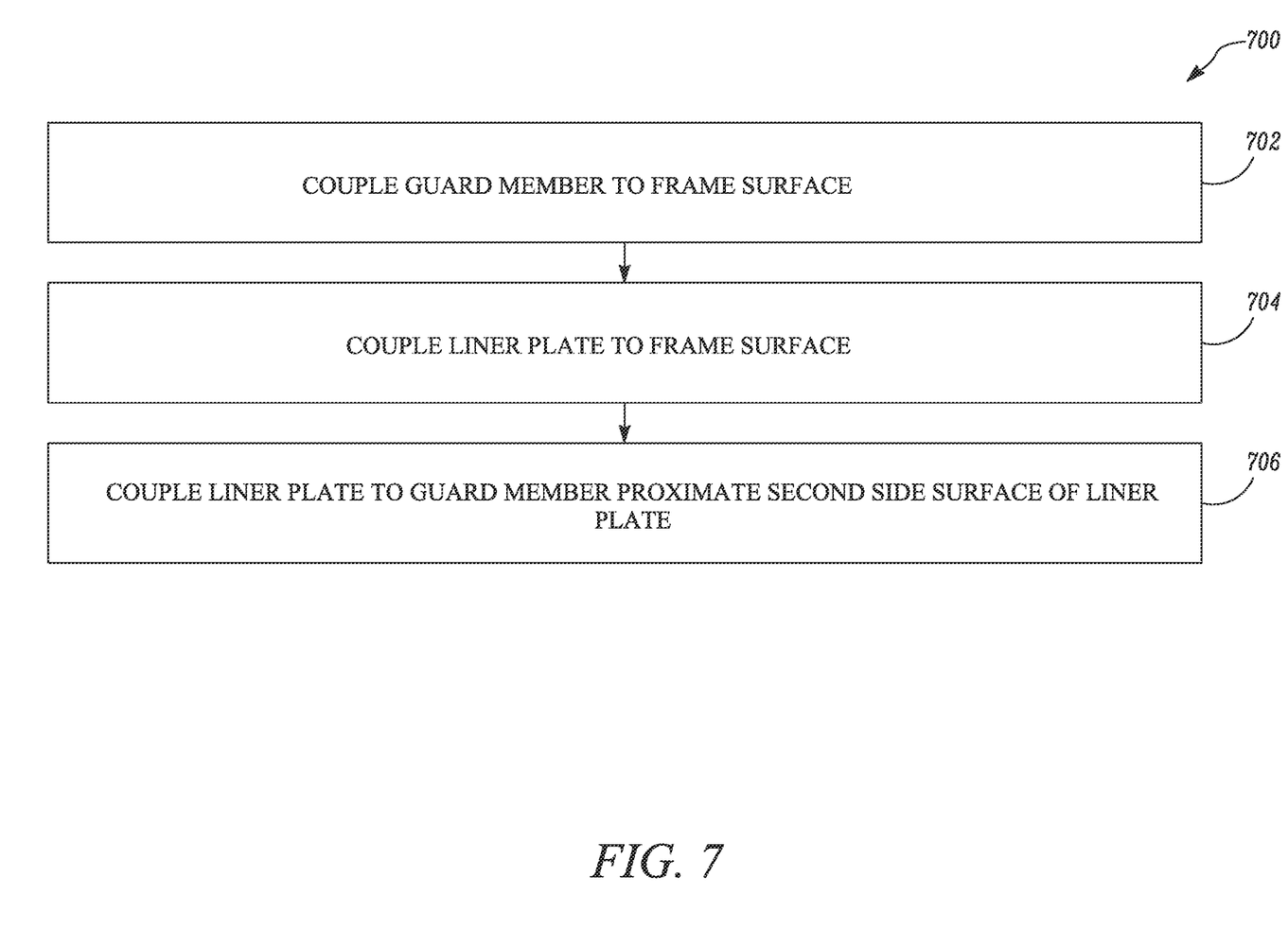
FIG. 7 illustrates a flowchart for a method of deflecting debris away from the work machine, according to examples of the present disclosure.

FIG. 7 illustrates a flowchart for the method 700 of deflecting debris away from the work machine 100. The work machine 100 has the frame 106 with the frame surface 108 and the axle opening 110, and the guard member 124 partially disposed above the axle opening 110 and partially projecting from the frame surface 108 both outward and toward the axle opening 110. The guard member 124 has the lower face 130, the region 132 of the frame surface 108 and the region 134 of the lower face 130 defining the volume "V1". At step 702, the guard member 124 is coupled to the frame surface 108. The guard member 124 defines the first end 126, such that the guard member 124 is coupled to the frame surface 108 proximate the first end 126.

At step 704, the liner plate 142 is coupled to the frame surface 108. The liner plate 142 defining the upper surface 148, the lower surface 150, the first side surface 152, and the second side surface 154. The liner plate 142 is coupled to the frame surface 108 proximate the first side surface 152 of the liner plate 142.

At step 706, the liner plate 142 is coupled to the guard member 124 proximate the second side surface 154 of the liner plate 142. The first and second side surfaces 152, 154 of the liner plate 142 are coupled to the frame surface 108 and the guard member 124, respectively, by welding. Further, the liner plate 142 and the guard member 124 are coupled to the frame surface 108 such that the first side surface 152 of the liner plate 142 is located between the first end 126 of the guard member 124 and the axle opening 110. Moreover, upon coupling of the liner plate 142 to the frame surface 108 and the guard member 124, the lower surface 150 of the liner plate 142 substantially limits access to the volume "V1" and prevents some debris from entering the volume "V1".

It may be desirable to perform one or more of the step shown in FIG. 7 in an order different from that depicted. Furthermore, various steps could be performed together.

While aspects of the present disclosure have been particularly shown and described with reference to the embodiments above, it will be understood by those skilled in the art that various additional embodiments may be contemplated by the modification of the disclosed machines, systems, and methods without departing from the spirit and scope of what is disclosed. Such embodiments should be understood to fall within the scope of the present disclosure as determined based upon the claims and any equivalents thereof.

The invention claimed is:

1. A liner plate guard assembly for a work machine having a frame with a frame surface and an axle opening, the guard assembly comprising:
a guard member at least partially disposed above the axle opening and projecting outward from the frame surface, the guard member comprising:
a lower face, wherein a region of the frame surface and a region of the lower face defining a volume;
a first end coupled to the frame surface; and
a second end opposite the first end, wherein the guard member continuously slopes downward and toward the axle opening from the first end to the second end; and
a liner plate comprising:
a body portion defining:
an upper surface;
a lower surface opposite to the upper surface;
a first side surface extending between the upper and lower surfaces, wherein the body portion is adapted to be coupled to the frame surface proximate the first side surface; and
a second side surface extending between the upper and lower surfaces, wherein the body portion is adapted to be coupled to the guard member proximate the second side surface, and wherein the body portion continuously slopes upward and away from the axle opening from the first side surface to the second side surface;
wherein, upon coupling of the body portion to the frame surface and the guard member, the body portion prevents at least some debris from entering the volume.

2. The guard assembly of claim 1, wherein, upon coupling of the body portion to the frame surface and the guard member, the first side surface of the body portion is located between the first end of the guard member and the axle opening.

3. The guard assembly of claim 2, wherein, upon coupling of the body portion to the frame surface and the guard member, the body portion, the frame surface, and the guard member together define a cavity, such that the lower surface of the body portion prevents all debris from entering the cavity.

4. The guard assembly of claim 1, wherein a first angle is defined between the frame surface and a region of the body portion, and the first angle lies approximately between 10 degrees and 90 degrees.

5. The guard assembly of claim 1, wherein the first and second side surfaces of the body portion are coupled to the frame surface and the guard member, respectively, by welding.

6. The guard assembly of claim 5, wherein the first and second side surfaces of the body portion are coupled to the frame surface and the guard member, respectively, by bevel joints.

7. The guard assembly of claim 1, wherein the body portion is made of a metal.

8. The guard assembly of claim 1, wherein the body portion defines a first maximum length and a first maximum width, the first maximum length of the liner plate being greater than the first maximum width of the liner plate by a factor of at least 3.

9. The guard assembly of claim 8, wherein the guard member defines a second maximum length, the second maximum length of the guard member being greater than the first maximum length of the liner plate.

10. The guard assembly of claim 8, wherein the guard member defines a second maximum width, the second maximum width of the guard member being greater than the first maximum width of the liner plate.

11. A work machine comprising:
a frame with a frame surface and an axle opening; and
a guard assembly coupled to the frame surface, the guard assembly including:
a guard member at least partially disposed above the axle opening and projecting outward from the frame surface, the guard member comprising:
a lower face, wherein a region of the frame surface and a region of the lower face defining a volume;
a first end coupled to the frame surface; and
a second end opposite the first end, wherein the guard member continuously slopes downward and toward the axle opening from the first end to the second end; and
a liner plate coupled to the frame surface and the guard member, the liner plate including:
a body portion defining:
an upper surface;
a lower surface disposed opposite to the upper surface;
a first side surface extending between the upper and lower surfaces, wherein the body portion is coupled to the frame surface proximate the first side surface; and
a second side surface extending between the upper and lower surfaces, wherein the body portion is coupled to the guard member proximate the second side surface, and wherein the body portion continuously slopes upward and away from the axle opening from the first side surface to the second side surface;
wherein, upon coupling of the body portion to the frame surface and the guard member, the body portion prevents at least some debris from entering the volume.

12. The work machine of claim 11, wherein, upon coupling of the body portion to the frame surface and the guard member, the first side surface of the body portion is located between the first end of the guard member and the axle opening.

13. The work machine of claim 11, wherein, upon coupling of the body portion to the frame surface and the guard member, the body portion, the frame surface, and the guard member together define a cavity, such that the lower surface of the body portion prevents all debris from entering the cavity.

14. The work machine of claim 11, wherein the first and second side surfaces of the body portion are coupled to the frame surface and the guard member, respectively, by welding.

15. The work machine of claim 11, wherein the body portion is made of a metal.

16. The work machine of claim 11, wherein the body portion defines a first maximum length and the guard member defines a second maximum length, the second maximum length being greater than the first maximum length.

17. The work machine of claim 11, wherein the body portion defines a first maximum width and the guard member defines a second maximum width, the second maximum width being greater than the first maximum width.

18. A method of deflecting debris away from a work machine having a frame with a frame surface and an axle opening, and a guard member at least partially disposed above the axle opening and projecting outward from the frame surface, the guard member having a lower face, wherein a region of the frame surface and a region of the lower face defining a volume, a first end, and a second end opposite the first end, wherein the guard member continuously slopes downward and inward from the first end to the second end, the method comprising:

coupling the first end of the guard member to the frame surface;

coupling a liner plate to the frame surface, the liner plate including a body portion defining an upper surface, a lower surface opposite the upper surface, a first side surface extending between the upper and lower surfaces, and a second side surface extending between the upper and lower surfaces, wherein the liner plate is coupled to the frame surface proximate the first side surface of the liner plate; and coupling the liner plate to the guard member proximate the second side surface of the liner plate, wherein the body portion continuously slopes upward and away from the axle opening from the first side surface to the second side surface;

wherein, upon coupling of the liner plate to the frame surface and the guard member, the lower surface of the liner plate substantially limits access to the volume and prevents at least some debris from entering the volume.

19. The method of claim 18 further comprising coupling the liner plate and the guard member to the frame surface such that the first side surface of the liner plate is located between the first end of the guard member and the axle opening.

20. The method of claim 18 further comprising coupling the first and second side surfaces of the liner plate to the frame surface and the guard member, respectively, by welding.

* * * * *